United States Patent
Nemoto (10) Patent No.: US 7,021,611 B2
(45) Date of Patent: Apr. 4, 2006

(54) METHOD FOR CONTROLLING DRIVE OF ACTUATOR OF ACTIVE VIBRATION ISOLATION SUPPORT SYSTEM

(75) Inventor: Hirotomi Nemoto, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/606,205

(22) Filed: Jun. 25, 2003

(65) Prior Publication Data

US 2004/0070126 A1    Apr. 15, 2004

(30) Foreign Application Priority Data

Jul. 3, 2002    (JP)    ............... 2002-194507

(51) Int. Cl.
*F16M 13/00*    (2006.01)

(52) U.S. Cl. .............................. 267/140.14; 267/140.15

(58) Field of Classification Search ........... 267/140.14, 267/140.15, 219, 136, 140.13, 140.3, 140.4
See application file for complete search history.

(56) References Cited

U.S. PATENT DOCUMENTS

| | | | | |
|---|---|---|---|---|
| 5,647,579 A | * | 7/1997 | Satoh | .............. 267/140.14 |
| 5,905,317 A | * | 5/1999 | Aoki | ............... 267/140.14 |
| 5,961,104 A | * | 10/1999 | Gennesseaux | ......... 267/140.14 |
| 6,254,069 B1 | * | 7/2001 | Muramatsu et al. | ... 267/140.14 |
| 6,422,546 B1 | * | 7/2002 | Nemoto et al. | ........ 267/140.14 |
| 6,631,895 B1 | * | 10/2003 | Nemoto | ............... 267/140.14 |

* cited by examiner

*Primary Examiner*—Melanie Torres
(74) *Attorney, Agent, or Firm*—Carrier, Blackman & Associates, P.C.; Joseph P. Carrier; William D. Blackman (57) ABSTRACT

A method for controlling the drive of an actuator of an active vibration isolation support system is provided in which one cycle of the actuator moving a movable member out and back is divided into a plurality of micro time regions, a voltage applied to the actuator is duty-controlled in each micro time region, and the duty ratio in at least the last micro time region is set to 0%. As a result, the current passing through the actuator can be made 0 in the final stage of the out and back movement cycle before the movable member moves back to the original position. This can minimize the current passing when the movable member moves back to its original position at the end of the cycle, thus suppressing the needless generation of heat in a coil of the actuator. Therefore, it is possible to prevent an increase in the electrical resistance of the coil which would otherwise hinder the achievement of a required value of current, and to prevent thermal damage to equipment surrounding the coil.

10 Claims, 6 Drawing Sheets

METHOD FOR CONTROLLING DRIVE OF ACTUATOR OF ACTIVE VIBRATION ISOLATION SUPPORT SYSTEM

BACKGROUND OF THE INVENTION

1. Field of the Invention

The present invention relates to a method for controlling the drive of an actuator of an active vibration isolation support system that includes an elastic body receiving a load from a vibrating body, a liquid chamber having a wall of which at least a part is formed from the elastic body, a movable member that moves out and back to change the capacity of the liquid chamber in a cycle, and an actuator that receives supply of current to generate an electromagnetic force for moving the movable member out.

2. Description of the Relevant Art

Figure 6:
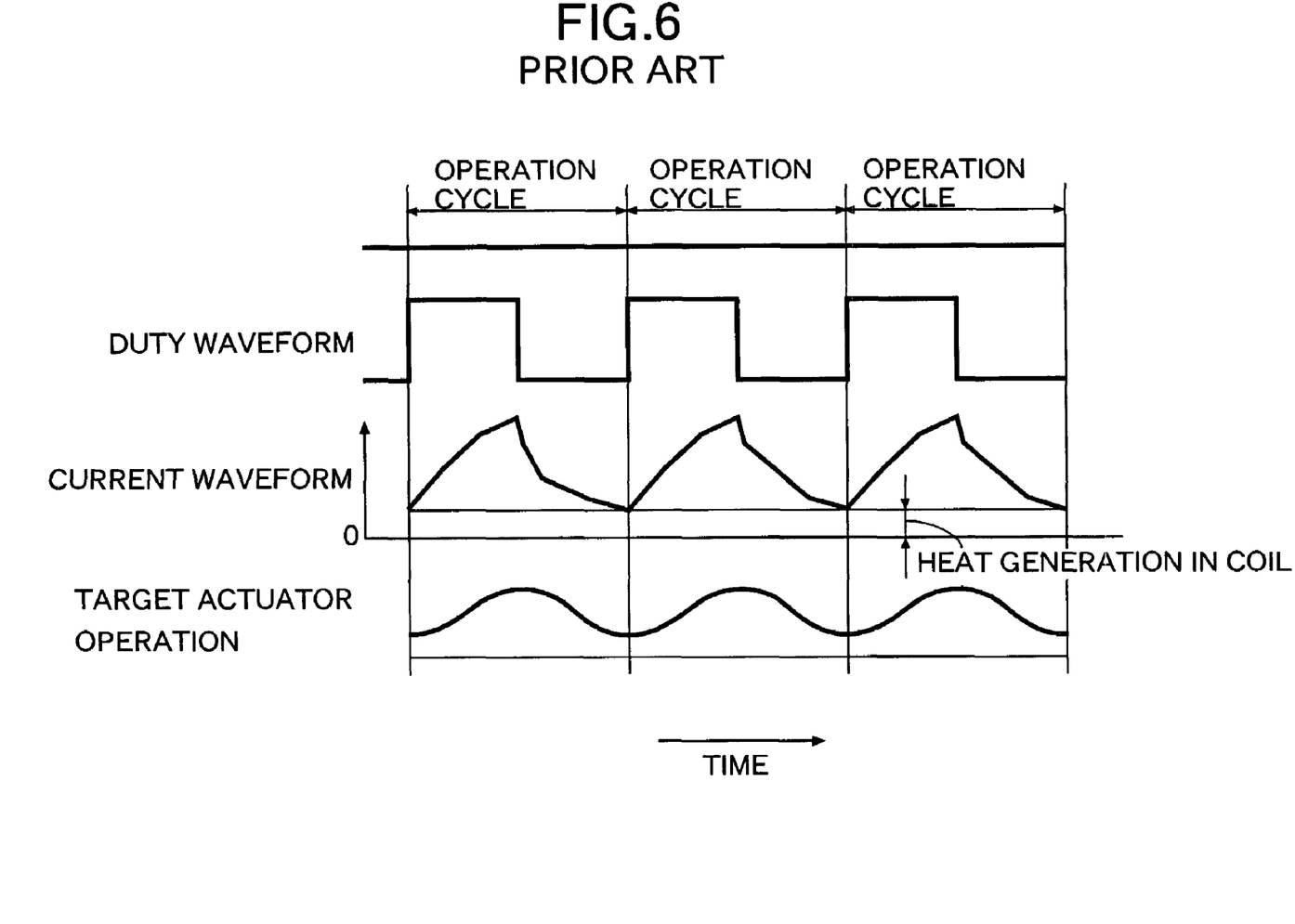
FIG. 6 is a diagram showing a conventional method for controlling an actuator.

In order to move the movable member of this type of active vibration isolation support system out and back in response to a vibration frequency of an engine, a voltage is cyclically applied to the actuator. As shown in FIG. 6, the movable member moves out due to an electromagnetic force generated by a coil upon applying a rectangular voltage pulse to the actuator in the first half of one cycle of the out and back movement of the movable member, and the movable member moves back due to the elastic force of a return spring by stopping the application of the voltage to the actuator in the second half of the cycle. Therefore, it is possible to reduce the vibration of the engine by alternately switching on and off the voltage applied to the actuator to make the movable member move out and back.

As shown in FIG. 6, even if a rectangular voltage pulse is cyclically applied to the actuator of the active vibration isolation support system, since the current passing through the actuator changes in a sawtooth waveform with a time lag, the current might not become zero within a period when the voltage to the actuator is switched off. This might cause the generation of heat in the coil of the actuator, thus raising its temperature to increase its electrical resistance, so that a required value of current might not be obtained, and equipment surrounding the coil might be thermally damaged.

SUMMARY OF THE INVENTION

The present invention has been achieved in view of the above-mentioned circumstances, and it is an object of the present invention to minimize the generation of heat in an actuator of an active vibration isolation support system.

In order to achieve this object, in accordance with a first aspect of the present invention, there is provided a method for controlling the drive of an actuator of an active vibration isolation support system that includes an elastic body receiving a load from a vibrating body, a liquid chamber having a wall of which at least a part is formed from the elastic body, a movable member that moves out and back to change the capacity of the liquid chamber in a cycle, and an actuator that receives a supply of current to generate an electromagnetic force for moving the movable member out, the method including the step of controlling the current supplied to the actuator such that the current passing through the actuator becomes zero at least when the movable member has moved back.

In accordance with this arrangement, the current passing through the actuator is controlled to become zero when the reciprocally movable member moves back to its original position after being moved out by the electromagnetic force generated by a current supplied to the actuator. Therefore, the current can be minimized when the actuator is stopped and the movable member moves back, thereby suppressing needless generation of heat in the actuator.

Furthermore, in accordance with a second aspect of the present invention, in addition to the first aspect, there is provided a method for controlling the drive of an actuator of an active vibration isolation support system wherein it further includes the steps of: setting a large number of consecutive micro time regions in the cycle; and carrying out duty control of the voltage that is applied to the actuator in each of the micro time regions.

In accordance with this arrangement, since the voltage applied to the actuator is duty-controlled in each of the large number of consecutive micro time regions set in a cycle of out and back movement of the movable member, the current passing through the actuator when the movable member has moved back can reliably be made zero.

An engine E of an embodiment corresponds to the vibrating body of the present invention, a first elastic body 14 of the embodiment corresponds to the elastic body of the present invention, and a first liquid chamber 24 of the embodiment corresponds to the liquid chamber of the present invention.

The above-mentioned object, other objects, characteristics, and advantages of the present invention will become apparent from an explanation of a preferred embodiment that will be described in detail below by reference to the attached drawings.

BRIEF DESCRIPTION OF THE DRAWINGS

FIG. 1 to FIG. 5 illustrate one embodiment of the present invention.

DETAILED DESCRIPTION OF THE INVENTION

An active vibration isolation support system M shown in FIGS. 1 to 4 is provided for elastically supporting an engine E on a vehicle body frame F of an automobile. The system is controlled by an electronic control unit U to which are connected an engine rotational speed sensor Sa for detecting the engine rotational speed, a load sensor Sb for detecting the load that is input to the active vibration isolation support system M, an acceleration sensor Sc for detecting the acceleration acting on the engine E, and a lift sensor Sd for detecting the amount of lift of a movable member 20 of an actuator 29, which will be described below.

Figure 1:
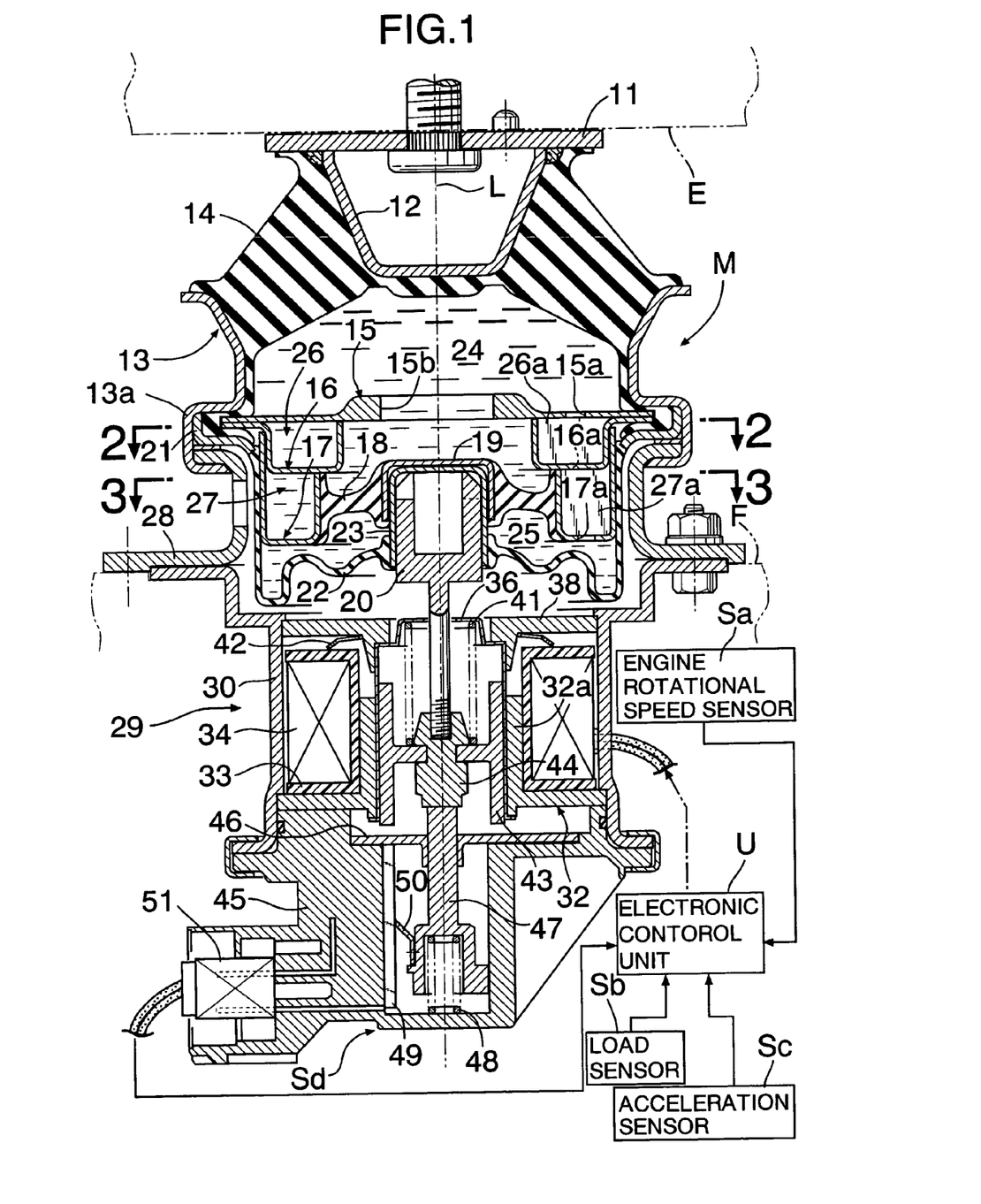
FIG. 1 is a longitudinal cross sectional view of an active vibration isolation support system.
Figure 2:
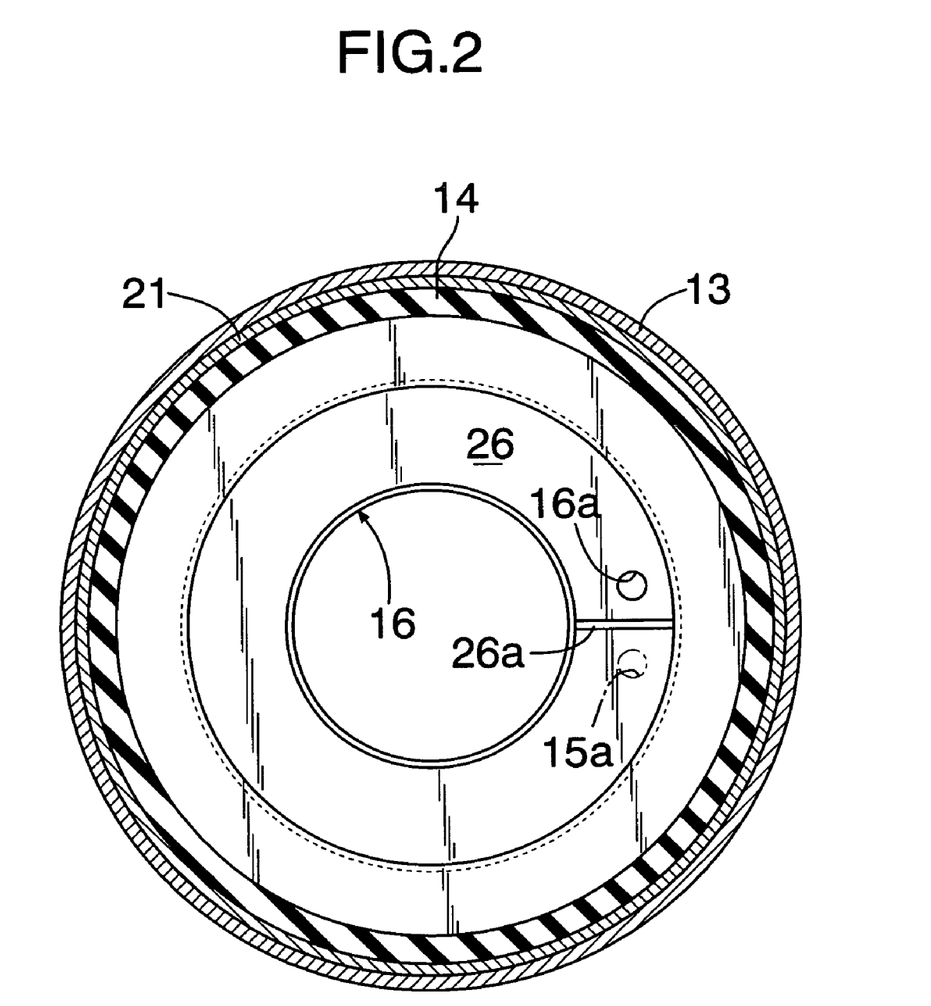
FIG. 2 is a cross sectional view along line 2—2 in FIG. 1.
Figure 3:
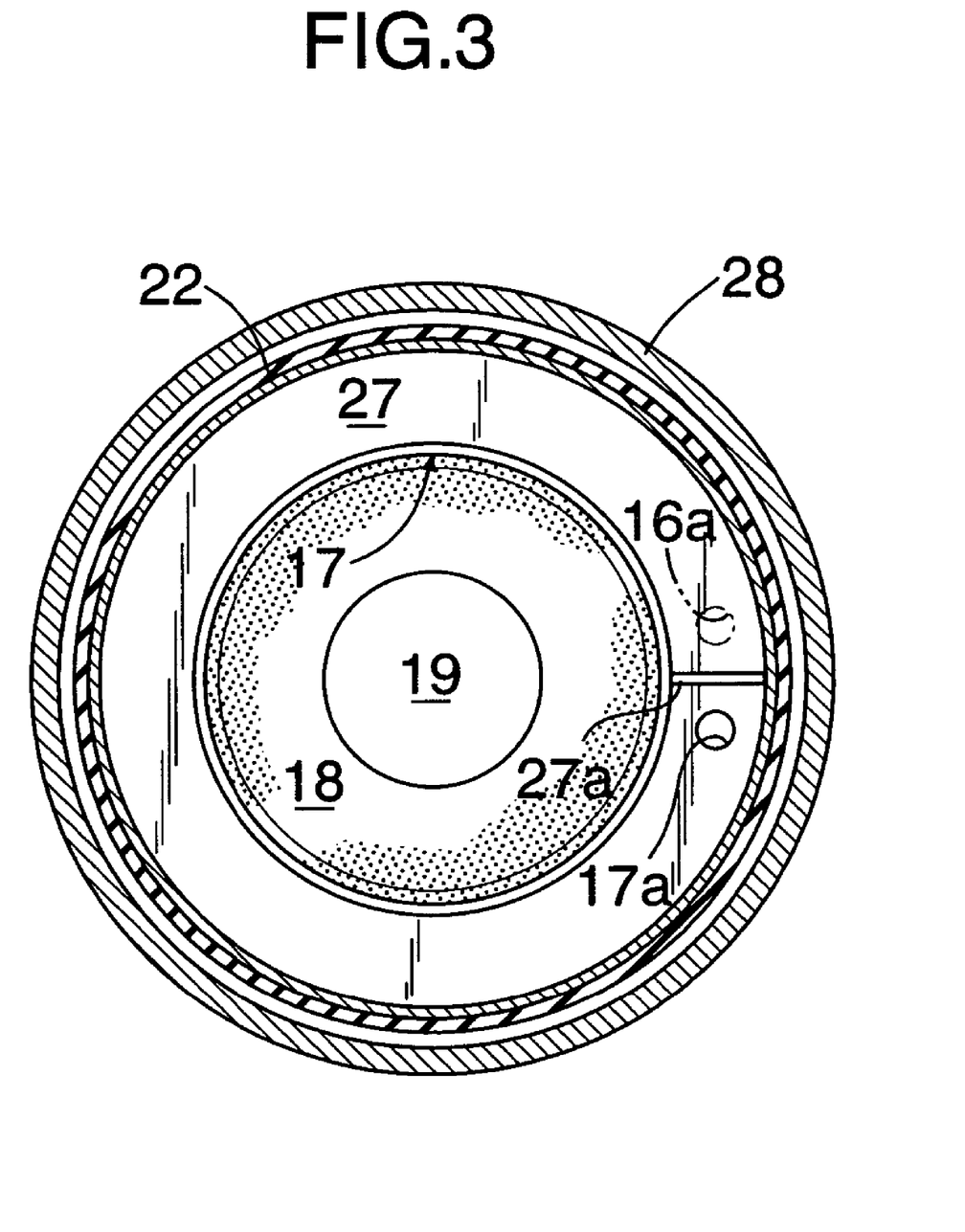
FIG. 3 is a cross sectional view along line 3—3 in FIG. 1.

The active vibration isolation support system M has a structure that is substantially symmetrical with respect to an axis L. The system includes an inner tube 12 that is welded to a plate-shaped mounting bracket 11 joined to the engine E, and an outer tube 13 that is disposed coaxially around the inner tube 12. The inner tube 12 and the outer tube 13 are bonded by vulcanization bonding to the upper end and lower end respectively of a first elastic body 14 made of a thick rubber. A disc-shaped first orifice-forming member 15 having an aperture 15*b* in its center, an annular second orifice-forming member 16 having a U-shaped cross section open at the top, and a third orifice-forming member 17 similarly having a U-shaped cross section open at the top, are welded into a single unit. The outer peripheries of the first orifice-forming member 15 and the second orifice-forming member 16 are superimposed and fixed in a crimping part 13*a* provided in a lower part of the outer tube 13.

The outer periphery of a second elastic body 18 made of a rubber membrane is fixed by vulcanization bonding to the inner periphery of the third orifice-forming member 17. A cap 19 that is fixed by vulcanization bonding to the inner periphery of the second elastic body 18 is press-fitted and fixed onto a movable member 20 that is disposed on the axis L in a vertically movable manner. A ring 21 is fixed in the crimping part 13*a* of the outer tube 13. The outer periphery of a diaphragm 22 is fixed to the ring 21 by vulcanization bonding. A cap 23 is fixed by vulcanization bonding to the inner periphery of the diaphragm 22, and press-fitted and fixed onto the movable member 20.

A first liquid chamber 24 within which a liquid is sealed, is defined between the first elastic body 14 and the second elastic body 18. A second liquid chamber 25 within which a liquid is sealed, is defined between the second elastic body 18 and the diaphragm 22. The first liquid chamber 24 and the second liquid chamber 25 communicate with each other via an upper orifice 26 and a lower orifice 27 that are formed from the first to third orifice-forming members 15, 16 and 17.

The upper orifice 26 is an annular passage formed between the first orifice-forming member 15 and the second orifice-forming member 16. A through hole 15*a* is formed in the first orifice-forming member 15 on one side of a partition 26*a* provided in a part of the upper orifice 26. A through hole 16*a* is formed in the second orifice-forming member 16 on the other side of the partition 26*a*. The upper orifice 26 is therefore formed along an almost complete circumference from the through hole 15*a* of the first orifice-forming member 15 to the through hole 16*a* of the second orifice-forming member 16 (see FIG. 2).

The lower orifice 27 is an annular passage formed between the second orifice-forming member 16 and the third orifice-forming member 17. The through hole 16*a* is formed in the second orifice-forming member 16 on one side of a partition 27*a* provided in a part of the lower orifice 27. A through hole 17*a* is formed in the third orifice-forming member 17 on the other side of the partition 27*a*. The lower orifice 27 is therefore formed along an almost complete circumference from the through hole 16*a* of the second orifice-forming member 16 to the through hole 17*a* of the third orifice-forming member 17 (see FIG. 3).

That is, the first liquid chamber 24 and the second liquid chamber 25 communicate with each other via the upper orifice 26 and the lower orifice 27 that are connected to each other in tandem.

Fixed in the crimping part 13*a* of the outer tube 13 is an annular mounting bracket 28 for fixing the active vibration isolation support system M to the vehicle body frame F. Welded to the lower face of the mounting bracket 28 is an actuator housing 30 forming an outer shell of the actuator 29 for driving the movable member 20.

Figure 4:
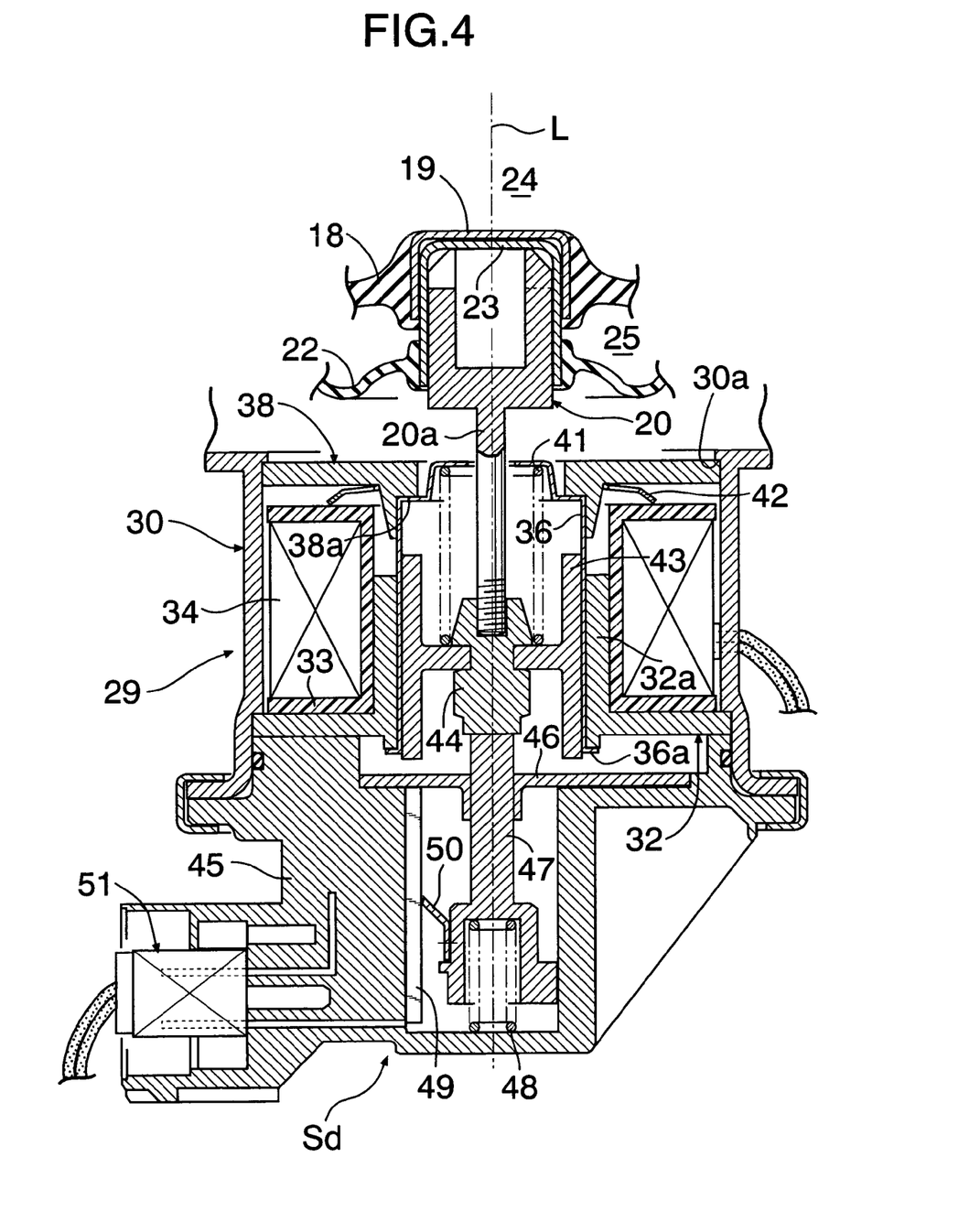
FIG. 4 is an enlarged view of an essential part of FIG. 1.

A yoke 32 is fixed to the actuator housing 30. An annular coil 34 wound around a bobbin 33 is housed in a space surrounded by the actuator housing 30 and the yoke 32. A bottomed-cylinder-shaped bearing 36 is inserted from below into a tubular part 32*a* of the yoke 32, the tubular part 32*a* being fitted in the inner periphery of the annular coil 34, and is positioned by a retaining part 36*a* at the lower end of the bearing 36 being engaged with the lower end of the yoke 32. A disc-shaped armature 38 that faces the upper face of the coil 34 is slidably supported on the inner periphery of the actuator housing 30, and a step 38*a* formed on the inner periphery of the armature 38 engages with the upper end of the bearing 36. The armature 38 is forced upward by a dish spring 42 that is disposed between the armature 38 and the upper face of the coil 34, and is positioned by being engaged with a retaining part 30*a* provided on the actuator housing 30.

A cylindrical slider 43 is slidably fitted in the inner periphery of the bearing 36. A shaft 20*a* extending downward from the movable member 20 runs loosely through the upper base of the bearing 36 and is connected to a boss 44 that is fixed to the interior of the slider 43. A coil spring 41 is positioned between the upper base of the bearing 36 and the slider 43, whereby the bearing 36 is forced upward by the coil spring 41 and the slider 43 is forced downward.

A lift sensor Sd provided beneath the actuator 29 includes a sensor housing 45 that is fixed to the lower end of the actuator housing 30. A sensor rod 47 is slidably supported in a guide member 46 that is fixed to the interior of the sensor housing 45, and forced upward by means of a coil spring 48 which is disposed between the sensor rod 47 and the base of the sensor housing 45, so as to be in contact with the boss 44 of the slider 43. A contact point 50 that is fixed to the sensor rod 47 is in contact with a resistor 49 that is fixed to the interior of the sensor housing 45. The electrical resistance between the lower end of the resistor 49 and the contact point 50 is input into the electronic control unit U via a connector 51. Since the lift of the movable member 20 is equal to the travel of the contact point 50, the lift of the movable member 20 can be detected based on the electrical resistance.

When the coil 34 of the actuator 29 is in a demagnetized state, the coil spring 41 applies a downward elastic force to the slider 43 slidably supported in the bearing 36, the coil spring 48 applies an upward elastic force thereto via the sensor rod 47 and the boss 44, so that the slider 43 comes to rest at a position where the elastic forces of the two coil springs 41 and 48 are in balance. When the coil 34 is energized in the above-mentioned state so as to draw the armature 38 downward, the step 38*a* pushes and slides the bearing 36 downward thus compressing the coil spring 41. As a result, the elastic force of the coil spring 41 increases to lower the slider 43, and the movable member 20 that is connected to the slider 43 via the boss 44 and the shaft 20*a* therefore descends, so that the second elastic body 18 connected to the movable member 20 deforms downward to increase the capacity of the first liquid chamber 24. Conversely, when the coil 34 is demagnetized, the movable member 20 rises, the second elastic body 18 deforms upward, and the capacity of the first liquid chamber 24 decreases.

When a low frequency engine shake vibration occurs while the automobile is traveling, a load that is input from the engine E deforms the first elastic body 14 thus changing the capacity of the first liquid chamber 24, so that the liquid travels to-and-fro between the first liquid chamber 24 and the second liquid chamber 25, which are connected to each other via the upper orifice 26 and the lower orifice 27. When the capacity of the first liquid chamber 24 increases and decreases, the capacity of the second liquid chamber 25 decreases and increases accordingly, and this change in the capacity of the second liquid chamber 25 is absorbed by elastic deformation of the diaphragm 22. Since the shapes and dimensions of the upper orifice 26 and the lower orifice 27 as well as the spring constant of the first elastic body 14 are set so that a high spring constant and a high attenuation force can be obtained in a region including the above-mentioned frequency of the engine shake vibration, the vibration that is transmitted from the engine E to the vehicle body frame F can be effectively reduced.

In the above-mentioned frequency region of engine shake vibration, the actuator 29 is maintained in a non-operational state.

When vibration occurs having a frequency higher than that of the above-mentioned engine shake vibration, that is, when idling vibration or muffled sound vibration due to rotation of a crankshaft of the engine E occurs, since the liquid within the upper orifice 26 and the lower orifice 27 that provide communication between the first liquid chamber 24 and the second liquid chamber 25 becomes stationary and cannot exhibit the vibration isolation function, the actuator 29 is operated so as to exhibit the vibration isolation function.

The electronic control unit U controls the application of current to the coil 34 of the actuator 29 based on signals from the engine rotational speed sensor Sa, the load sensor Sb, the acceleration sensor Sc and the lift sensor Sd. More specifically, when the engine E is biased downward due to the vibration and thus the capacity of the first liquid chamber 24 decreases to increase the liquid pressure, the armature 38 is drawn in by energizing the coil 34. As a result, the armature 38 moves downward together with the movable member 20 while compressing the coil spring 41, thus deforming downward the second elastic body 18 that is connected along its inner periphery to the movable member 20. The capacity of the first liquid chamber 24 thereby increases to suppress the increase in the liquid pressure, so that the active vibration isolation support system M generates an active support force to prevent transmission of the downward load from the engine E to the vehicle body frame F.

Conversely, when the engine E is biased upward due to the vibration and thus the capacity of the first liquid chamber 24 increases to decrease the liquid pressure, the drawing-in of the armature 38 is canceled by demagnetizing the coil 34. As a result, the armature 38 moves upward together with the movable member 20 due to the elastic force of the coil spring 41, thus deforming upward the second elastic body 18 that is connected along its inner periphery to the movable member 20. The capacity of the first liquid chamber 24 thereby decreases to suppress the decrease in the liquid pressure, so that the active vibration isolation support system M generates an active support force to prevent transmission of the upward load from the engine E to the vehicle body frame F.

The electronic control unit U compares the actual lift of the movable member 20 that has been detected by the lift sensor Sd with a target lift thereof that has been calculated based on outputs from the engine rotational speed sensor Sa, the load sensor Sb, and the acceleration sensor Sc, and the operation of the actuator 29 is feedback-controlled so that a deviation converges to 0.

Figure 5:
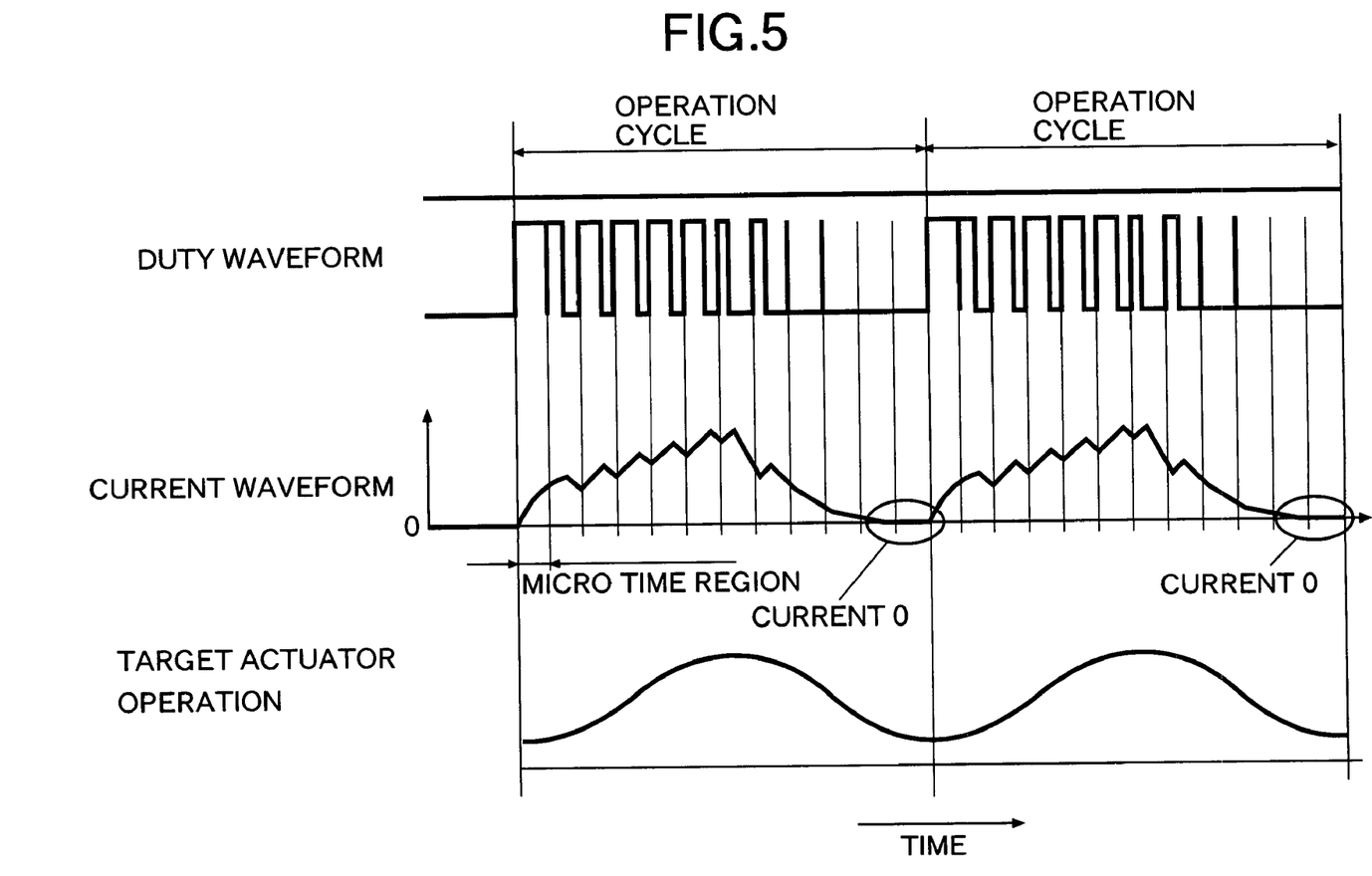
FIG. 5 is a diagram showing a method for controlling an actuator.

As shown in FIG. 5, when the target lift of the actuator 29 is in a sinusoidal waveform having a fixed period, a large number of consecutive micro time regions are set in the fixed period, and duty control of the voltage that is applied to the actuator 29 is carried out in each of the micro time regions. In the present embodiment, 12 micro time regions together form one cycle for the lift of the actuator 29, and duty control of the voltage that is applied to the actuator 29 is carried out individually in each of the 12 micro time regions.

More specifically, the duty ratios of the 12 micro time regions are decreased gradually from 100% such that the duty ratios of the last two micro time regions are set at 0%. As a result, the lift of the actuator 29 can be obtained as a sinusoidal wave form with 12 micro time regions in one cycle. Decreasing the number of consecutive micro time regions whose duty ratios change with a defined pattern from the above number of 12, shortens the cycle of the lift. Conversely, increasing the number of consecutive micro time regions, lengthens the cycle of the lift. Furthermore, changing the pattern of the duty ratios of a plurality of micro time regions forming one cycle in various ways, controls the waveform of the lift of the actuator 29 as desired.

Unlike the conventional example explained by reference to FIG. 6, in the present embodiment, the current becomes zero at the end of one cycle of the lift of the actuator 29 (that is, one cycle of moving out and back of the movable member 20), and thus generation of heat in the coil 34 of the actuator 29 can be minimized, thereby preventing the electrical resistance of the coil 34 from increasing to hinder the achievement of a required value of current, and preventing thermal damage to equipment surrounding the coil 34.

In order to make the current zero in the final stage of moving back of the movable member 20 that is moved out and back by the actuator 29, since the current cannot be made zero instantly by setting the duty ratio of the micro time region to 0%, it is necessary to gradually decrease the duty ratios of a plurality of preceding micro time regions toward 0%. That is, in order to make the current zero in the final stage of moving back of the movable member 20, it is necessary to totally control the duty ratios of the plurality of micro time regions in conjunction with each other.

An embodiment of the present invention has been described in detail above, but the present invention can be modified in a variety of ways without departing from the spirit and scope of the invention.

The active vibration isolation support system M supporting the engine E of the automobile is illustrated as one example in the embodiment, but the active vibration isolation support system of the present invention can be applied to the support of other vibrating bodies such as a machine tool.

What is claimed is:

1. A method for controlling the drive of an actuator of an active vibration isolation support system that includes
   an elastic body receiving a load from a vibrating body,
   a liquid chamber having a wall of which at least a part is formed from the elastic body,
   a movable member that moves out and back to change the capacity of the liquid chamber in a cycle, and
   an actuator that receives a supply of current to generate an electromagnetic force for moving the movable member out,
the method comprising the step of:
   controlling the current supplied to the actuator such that the current passing through the actuator during operation becomes zero at least when the movable member has moved back.

2. The method according to claim 1, wherein it further comprises the steps of:
   setting a large number of consecutive micro time regions in the cycle; and
   carrying out duty control of the voltage that is applied to the actuator in each of the micro time regions.

3. The method of claim 2, wherein the duty ratios of the micro time regions are decreased gradually from 100% such that the duty ratios of the last two micro time regions are set at 0%.

4. The method according to claim 2, wherein the method further comprises the step of setting a large number of duty cycles within the cycle of lift of the actuator.

5. The method according to claim 1 wherein the method further comprises the step of:
controlling the waveform of the lift of the actuator by controlling the current supplied to the actuator.

6. A method for controlling the drive of an actuator of an active vibration isolation support system that includes
an elastic body receiving a load from a vibrating body,
a liquid chamber having a wall of which at least a part is formed from the elastic body,
a movable member that moves out and back to change the capacity of the liquid chamber, a single excursion out and back by the movable member defining a movement cycle, and
an actuator that receives a supply of current to generate an electromagnetic force for moving the movable member out, and
a sensor for sensing the position of the movable member,
the method comprising the steps of:
controlling the current supplied to the actuator such that the amount of current supplied is dependent upon the position of the movable member as sensed by the sensor, and
controlling the current supplied to the actuator so that the current passing through the actuator becomes zero at least when the movable member has moved back.

7. The method of claim 6, wherein the method further comprises the step of:
setting a large number of consecutive micro time regions in the movement cycle.

8. The method of claim 7, wherein the method further comprises the step of:
carrying out duty control of the voltage that is applied to the actuator in each of the micro time regions.

9. The method of claim 7, wherein the duty ratios of the micro time regions are decreased gradually from 100% such that the duty ratios of the last two micro time regions are set at 0%.

10. A method for controlling the drive of an actuator of an active vibration isolation support system that includes
an elastic body receiving a load from a vibrating body,
a liquid chamber having a wall of which at least a part is formed from the elastic body,
a movable member that moves out and back to change the capacity of the liquid chamber in a cycle, and
an actuator that receives a supply of current to generate an electromagnetic force for moving the movable member out,
the method comprising the steps of:
a) setting a large number of consecutive micro time regions in the cycle; and
b) carrying out duty control of the voltage that is applied to the actuator in each of the micro time regions, wherein the duty ratios of the micro time regions are decreased gradually from 100% such that the duty ratios of the last two micro time regions are set at 0%.

* * * * *